(12) United States Patent
Kondoh et al.

(10) Patent No.: US 7,589,879 B2
(45) Date of Patent: Sep. 15, 2009

(54) METHOD AND APPARATUS FOR ATTACHING PART, LIGHT SCANNING APPARATUS AND IMAGE FORMING APPARATUS

(75) Inventors: Hirofumi Kondoh, Ohta-ku (JP); Mihito Okitsu, Ohta-ku (JP); Masaru Namekata, Ohta-ku (JP); Hirokazu Kurihara, Ohta-ku (JP); Takafumi Kondo, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 832 days.

(21) Appl. No.: 10/978,564

(22) Filed: Nov. 2, 2004

(65) Prior Publication Data

US 2005/0122555 A1   Jun. 9, 2005

(30) Foreign Application Priority Data

Nov. 7, 2003   (JP) .............................. 2003-377669

(51) Int. Cl.
*G02B 26/08*   (2006.01)
(52) U.S. Cl. ...................................... 359/209; 359/819
(58) Field of Classification Search ................. 359/216, 359/819, 196–218
See application file for complete search history.

(56) References Cited

U.S. PATENT DOCUMENTS

| | | | | |
|---|---|---|---|---|
| 5,506,719 | A | * | 4/1996 | Murakami et al. .......... 359/216 |
| 5,995,268 | A | * | 11/1999 | Shiraishi et al. ............. 359/204 |
| 6,601,427 | B2 | | 8/2003 | Kondou et al. |
| 6,657,760 | B2 | * | 12/2003 | Fukita et al. ................. 359/205 |
| 6,745,448 | B2 | | 6/2004 | Kondou et al. |
| 2004/0035166 | A1 | | 2/2004 | Maeda et al. |

FOREIGN PATENT DOCUMENTS

| | | |
|---|---|---|
| JP | 5-103164 | 4/1993 |
| JP | 6-109998 | 4/1994 |
| JP | 6-214179 | 8/1994 |
| JP | 7-84205 | 3/1995 |
| JP | 9-236769 | 9/1997 |
| JP | 11-218718 | 8/1999 |
| JP | 11-231245 | 8/1999 |
| JP | 2000-28949 | 1/2000 |
| JP | 2001-162864 | 6/2001 |
| JP | 2001-183596 | 7/2001 |
| JP | 2001-208996 | 8/2001 |
| JP | 2002-23094 | 1/2002 |
| JP | 2002-244061 | 8/2002 |
| JP | 2002-267985 | 9/2002 |
| JP | 2002-341467 | 11/2002 |
| JP | 2003-43395 | 2/2003 |

OTHER PUBLICATIONS

U.S. Appl. No. 10/609,645, filed Jul. 1, 2003, Taiki Maeda et al.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A method for attaching a part, including preparing an optical part-holding member for holding an optical part and a housing member having a bottom wall and mountable the optical part-holding member, identifying a plurality of part-attaching portions forming nodal points on the bottom wall of the housing member, and fixing the optical part-holding member for holding the optical part to the part-attaching portions by spacing from the bottom wall of the housing other than the part-attaching portions.

29 Claims, 7 Drawing Sheets

METHOD AND APPARATUS FOR ATTACHING PART, LIGHT SCANNING APPARATUS AND IMAGE FORMING APPARATUS

CROSS REFERENCE TO THE RELATED APPLICATION

The application claims the priority benefit of Japanese Patent Application No. 2003-377669 filed on Nov. 7, 2003, the entire descriptions of which are incorporated herein by reference.

BACKGROUND OF THE INVENTION

1. Field of the Invention

The present invention relates to a method and an apparatus for attaching a part, more specifically to a method and an apparatus for attaching a part capable of attaching the part to a fixing member without transmitting vibrations to the part, a light scanning apparatus using the method and apparatus for attaching the part, and an image forming apparatus using the light scanning apparatus.

2. Description of Related Art

Conventionally, it has been known that an image forming apparatus using electronic photograph process such as a laser printer, a digital photocopier or the like includes a light scanning apparatus for radiating laser or the like on a sensitive drum and scanning thereon. In such an image forming apparatus, vibrations generated by a driving source, driving gears, driving belts or the like are transmitted to the light scanning apparatus, hence the light scanning apparatus vibrates during scanning a beam to a photoconductor drum to generate linear uneven shading or a banding on an image formed on a recording paper or transfer paper, as a result, there is a problem that quality of the image drops.

Therefore, conventionally, there has been proposed a optical scanning apparatus in which a base member having a high rigidity is mounted on a structural member constituting a portion of a body of a recording device, housings for holding optical parts are mounted on the base member, thereby an affection by a lower rigidity of the structural member or vibrations based on the lower rigidity is adapted to eliminate (for reference, see Japanese Patent No. 3216261).

However, in the art disclosed in the above-mentioned patent, the base member and the housings resonate when there natural frequencies accord, there is a problem that the optical part vibrates greatly, actually, the banding or the like occurs, therefore the image quality deteriorates.

In addition, to increase the rigidity of the base member if a mass of the base member is increased, there is a problem that a flexure occurs in the structural member and an optical axis of an optical system deviates from the photoconductive drum.

SUMMARY OF THE INVENTION

Therefore, the present invention has been made in view of the above-mentioned problems and an object thereof is to provide a method and an apparatus for attaching a part in which in which one or more parts are attached to a fixing member with a sufficient quake protection without increasing a mass of the fixing member, a light scanning apparatus using the method and apparatus for attaching a part and an image forming apparatus using the light scanning apparatus.

To accomplish the above object, a method for attaching a part in an aspect of the present invention comprises preparing a fixing member having a bottom wall and for attaching the part, identifying a plurality of part-attaching portions forming nodal points on the bottom wall of the fixing member, mounting the part on the part-attaching portions in a state that the part is spaced from the bottom wall between the part-attaching portions, and fixing the part to the fixing member.

A method for attaching a part in another aspect of the present invention comprises preparing an optical part-holding member for holding an optical part and a housing member having a bottom wall and mountable the optical part-holding member, identifying a plurality of part-attaching portions forming nodal points on the bottom wall of the housing member, and mounting the optical part-holding member for holding the optical part on the part-attaching portions by bridging the part-attaching portions so that the optical part-holding member is spaced from the bottom wall except for the part-attaching portions.

An apparatus for attaching a part in yet another aspect of the present invention comprises a fixing member having a bottom wall and for attaching a part, and a plurality of part-attaching portions disposed on the bottom wall of the fixing member and configured to form nodal points, the part being mounted on the part-attaching portions through a spacing mechanism for spacing the part from the bottom wall except for the plurality of part-attaching portions.

The spacing mechanism includes projected parts configured to stand from the bottom wall of the fixing member on the part-attaching portions for forming the nodal points.

The projected part comprises a drawn portion formed by drawing the bottom wall of the fixing member.

The spacing mechanism includes a spacer disposed on each of the part-attaching portions for forming the nodal points.

An apparatus for attaching a part in yet another aspect of the present invention comprises a housing member having a bottom wall, a plurality of part-attaching portions provided on the bottom wall of the housing member and forming nodal points of the housing member and, an optical part-holding member disposed on each of the plurality of part-attaching portions for holding an optical part, the optical part being mounted on the part-attaching portions to space from the bottom wall of the housing through the optical part-holding members, except for the part-attaching portions.

The fixing member is made by formation of a plate metal in one embodiment.

DETAILED DESCRIPTION OF THE PREFERRED EMBODIMENTS

Embodiments of a method and an apparatus for attaching a part according to the present invention, and an optical scanning apparatus using the method and apparatus for attaching a part will be explained with reference to the accompanying drawings below.

Figure 1:
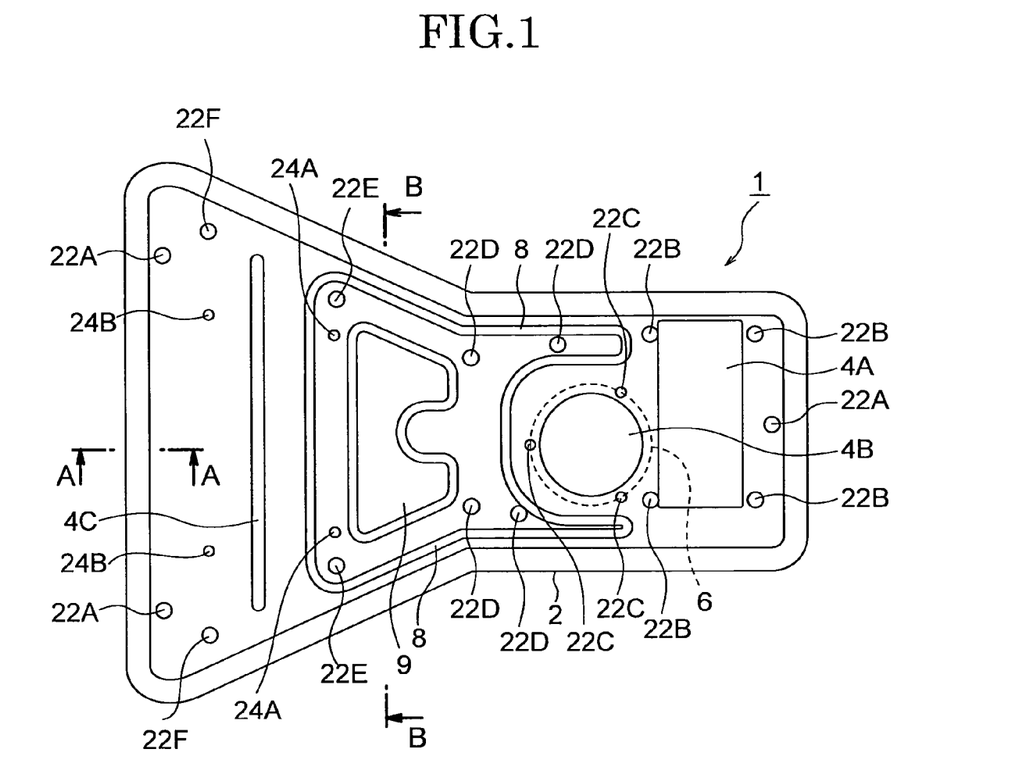
FIG. 1 is a top plan view of a housing made of a plate metal in a light scanning apparatus to which a method foe attaching a part according to the present invention is applied.
Figure 5:
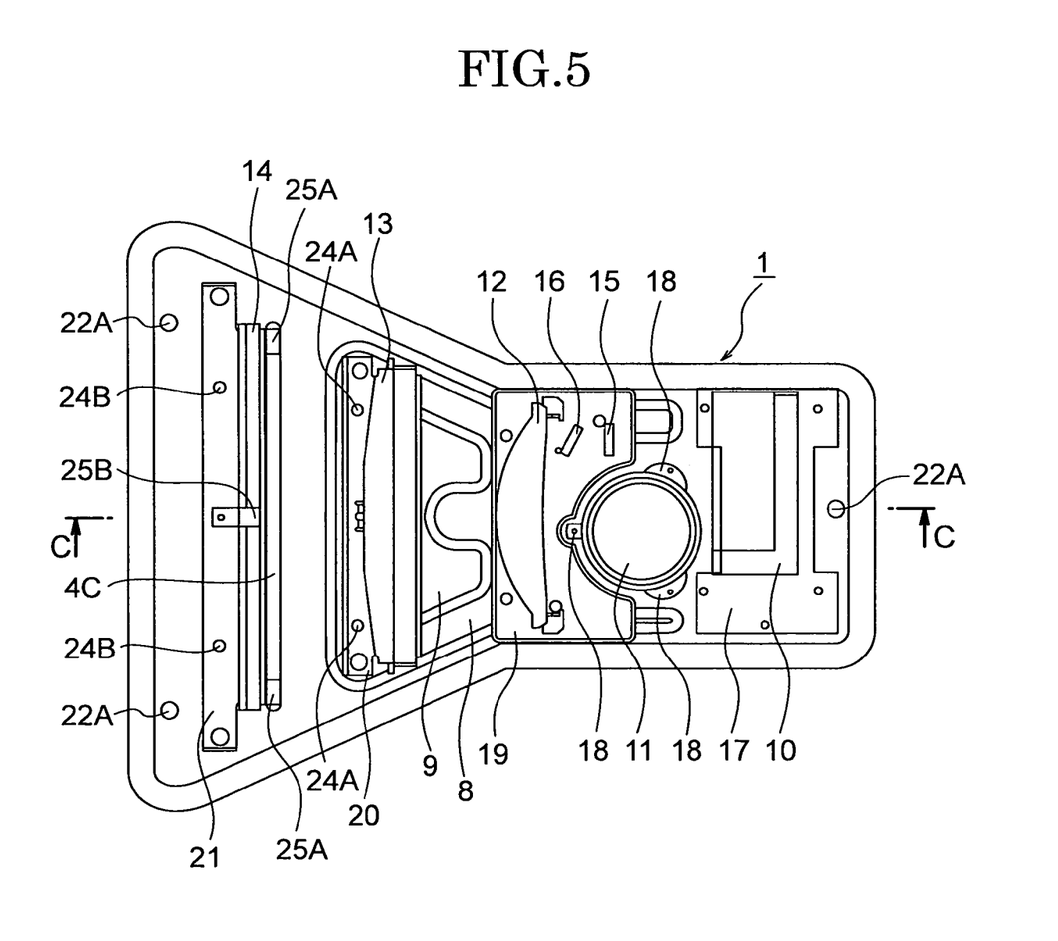
FIG. 5 is a top plan view showing a state in which an optical part is mounted on the housing made of the plate metal shown in FIG. 1.
Figure 6:
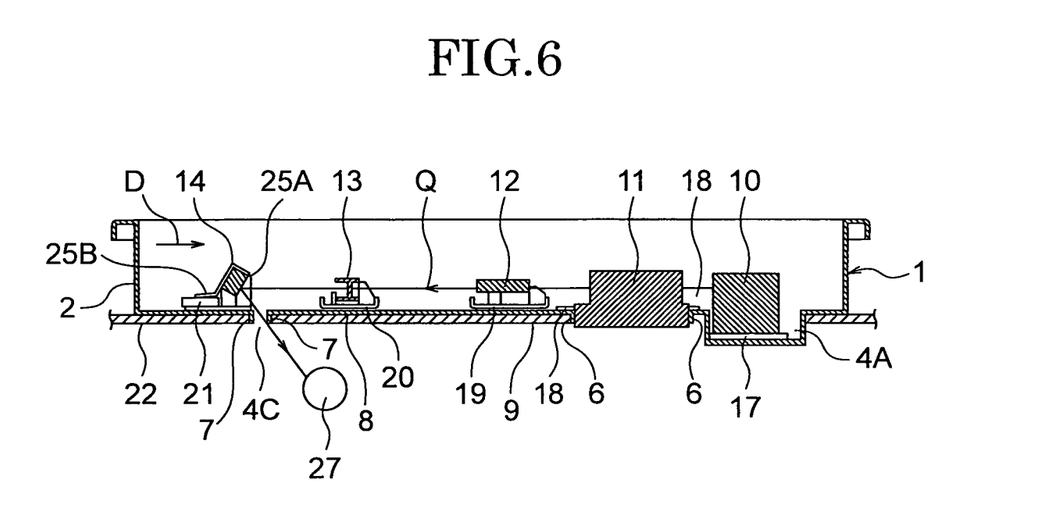
FIG. 6 is a sectional view taken along C-C line in FIG. 5.

One embodiment of the optical scanning apparatus to which the method and apparatus for attaching a part according to the present invention are applied is shown in FIGS. 5 and 6. The optical scanning apparatus comprises a fixing member, for example, a housing 1 as shown in FIG. 1. The housing 1 is made of one plate metal, for example, by forming. In one embodiment, the housing 1 is made of one magnetic steel-plate into a box-like shape having a bottom wall 3 by a drawing process (see FIGS. 2 and 3).

Figure 2:
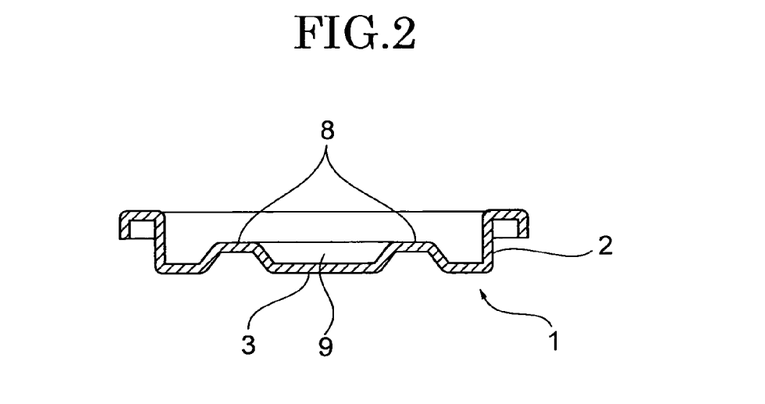
FIG. 2 is a sectional view taken along B-B line in FIG. 1.
Figure 3:
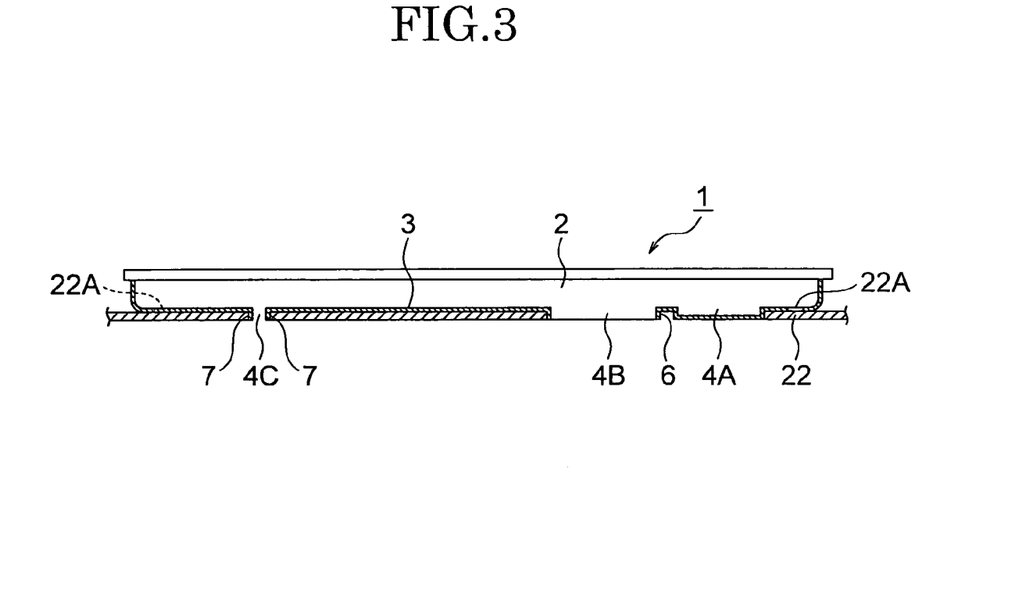
FIG. 3 is a partial sectional view showing the housing made of the plate metal shown in FIG. 1 as viewed from a side surface thereof.
Figure 4:
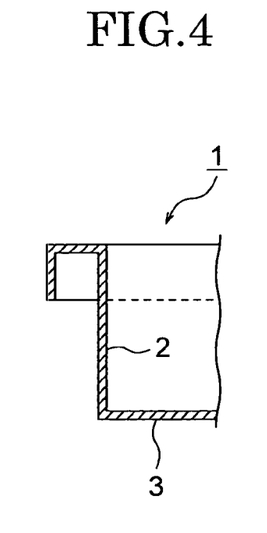
FIG. 4 is a partially enlarged sectional view taken along A-A line in FIG. 1.

As shown in shown in FIGS. 1 to 4 and 6, the housing 1 made of the plate metal has a bent peripheral wall 2 throughout the entire circumference thereof. In the embodiment, the peripheral wall 2 is formed into a generally U-character shape in section, as shown in FIG. 4. However, the peripheral wall 2 is not limited to the shape, it may be formed into an L-character shape in section. By providing the bent portion on the peripheral wall 2 of the housing 1, it is possible to increase strength of the housing 1.

Parts such as a light source unit 10, a polygon mirror-scanner unit 11, an f θ lens 12 as an elongate optical part, a scanning lens 13 as an elongate optical part, a returning mirror 14 as an elongate optical part, a cylindrical lens 15 and a returning mirror 16 are mounted on the housing 1 made of the plate metal, as shown in FIGS. 5 and 6.

A plurality of part-attaching portions to form nodal points is provided on the bottom wall 3 of the housing 1. The parts of the light source unit 10 and so on as described above are mounted on the plurality of part-attaching portions for forming the nodal points through a spacing mechanism to space the parts from the bottom wall 3 of the housing 1 except for the plurality of part-attaching portions.

The spacing mechanism will be described below.

Meanwhile, in case of one part, one part-attaching portion may be provided for the one part.

Here, the nodal points correspond to immovable portions that the housing 1 does not vibrate when it is subjected to vibrations. Each nodal point may be determined by a design of the housing 1 and so on. In one embodiment, the nodal points of the housing 1 can be detected by a holographic interferometer, for example. More specifically, the housing 1 is excited to generate vibrations, one of two divided laser lights is irradiated to the vibrated housing, the reflected light is irradiated to a photographic plate and another laser light is irradiated to the photographic plate. The both laser lights are interfered on the photographic plate, and vibration-distribution of the housing is detected by interference fringes generated on the photographic plate for interference of the laser lights. In the holography, bright portions correspond to the nodal points. In this way, because the nodal points, which do not vibrate are identified on the bottom wall of the housing and the parts are attached on the nodal points, even if the housing receives vibrations, the vibrations are not transmitted to the parts.

A concave portion 4A for attaching the light source unit 10, a circular opening 4B for attaching the polygon mirror-scanner unit 11, and a linear opening 4C for guiding light beam extending in a main scanning direction are provided at the part-attaching portions on the bottom wall 3 of the housing 1 made of the plate metal.

The spacing mechanism is configured to space the parts from the bottom wall of the housing between the plurality of part-attaching portions or except for the part-attaching portions.

In one embodiment, the spacing mechanism includes a drawn portion 8 provided on the bottom wall 3 of the housing 1 at the part-attaching portions. In one example, the drawn portion 8 is disposed along the peripheral wall 2 of the housing 1 made of the plate metal. The drawn portion 8 is preferably formed simultaneously with the forming of the housing 1. The drawn portion 8 extends from the vicinity of the linear opening 4C to the circular opening 4B and formed to surround the circular opening 4B from both sides thereof. Meanwhile, a concave portion 9 is provided in an inner side of the drawn portion 8. The concave portion 9 is flush with the bottom wall 3, as shown in FIG. 2.

The parts such as the light source unit 10 are mounted through the spacing mechanism, namely, the drawn portion 8 on the bottom wall 3, consequently, the parts are disposed to space from the bottom wall 3 of the housing 1.

In another embodiment, the spacing mechanism includes optical-part holding members 17, 18, 19, 20 and 21 disposed between the parts and the bottom wall 3 of the housing 1, respectively, at the part-attaching portions for forming the nodal points. The light source unit 10 is held on the optical-part holding member 17, the polygon mirror-scanner unit 11 is held on the optical-part holding member 18, the f θ lens, the cylindrical lens 15 and the returning mirror 16 are held on the optical-part holding member 19, the scanning lens 13 is held on the optical-part holding member 20, and the returning mirror 14 is held on the optical-part holding member 21. Therefore, these parts are mounted to space from the bottom wall 3 of the housing 1 on the part-attaching portions by means of the optical-part holding members. Meanwhile, the housing 1 is provided with mounting holes 22A, as shown in FIGS. 1 and 3. The housing 1 is fixed to a structural member 22 of an image forming apparatus (not shown) such as a copying machine by bolts inserted into the mounting holes 22A.

Here, a plurality of parts may be held on one optical-part holding member, alternatively, each of a plurality of parts may be held on each of a plurality of optical-part holding members.

In the embodiment, the optical-part holding member 17 is disposed in the concave portion 4A of the bottom wall 3 and fixed by fasteners such as screws. In FIG. 1, reference numeral 22B denotes mounting holes for mounting the optical-part holding member, in which the screws are inserted.

The optical-part holding member 19 is mounted on the drawn portion 8 and fixed thereto by screws.

Meanwhile, in FIG. 1, reference numeral 22D denotes mounting holes for mounting the optical-part holding member 19.

The optical-part holding member 20 is disposed on the drawn portion 8, and fixed thereto by screws. Of course, the optical-part holding member 20 or the other optical-part holding members may be directly disposed on the bottom wall 3 of the housing 1 without intervening the space mechanism, for example, the drawn portion 8.

In the embodiment, the optical-part holding member 20 is formed into a box-like shape to increase the strength thereof.

In FIG. 1, reference numeral 22E denotes mounting holes for mounting the optical-part holding member 20. The mounting holes 22E also lie on nodal points of vibrations transmitting from the structural member 22 to the housing 1.

Figure 7:
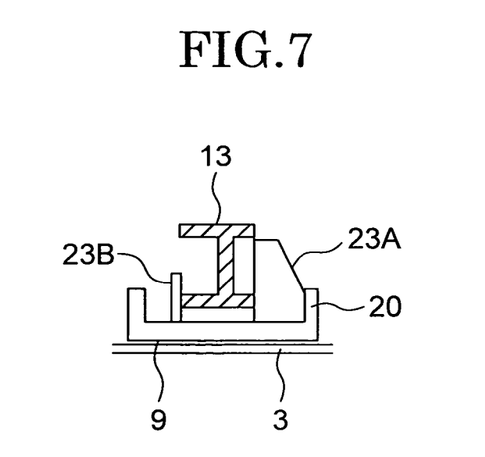
FIG. 7 is a side view showing enlargedly a held state of a scanning lens to an optical part-holding member, as shown in FIG. 5.

The scanning lens 13 is held on the optical-part holding member 20 through a positioning member 23A and a holding member 23B and disposed so that portions of the scanning lens 13 other than the drawn portion 8 are spaced from the bottom wall 3 of the housing 1. Positioning protrusions 24A for positioning the optical-part holding member 20 on the housing 1 are provided on the bottom wall 3. With the structure, if a problem such as damage occurs in the scanning lens 13, because the optical-part holding member 20 and the scanning lens 13 are removed and exchangeable integrally, this is convenient, and if the optical-part holding member 20 and the scanning lens 13 are separated, it is preferably possible to recycle them.

The optical-part holding member 21 is positioned by positioning protrusions 24B and 24B shown in FIG. 1 and fixed on the bottom wall 3 by screws. In FIG. 1, reference numeral 22F denotes mounting holes for attaching the optical-part holding member 21. The mounting holes 22F are disposed on nodal points in the vicinity of the peripheral wall 2.

Figure 8:
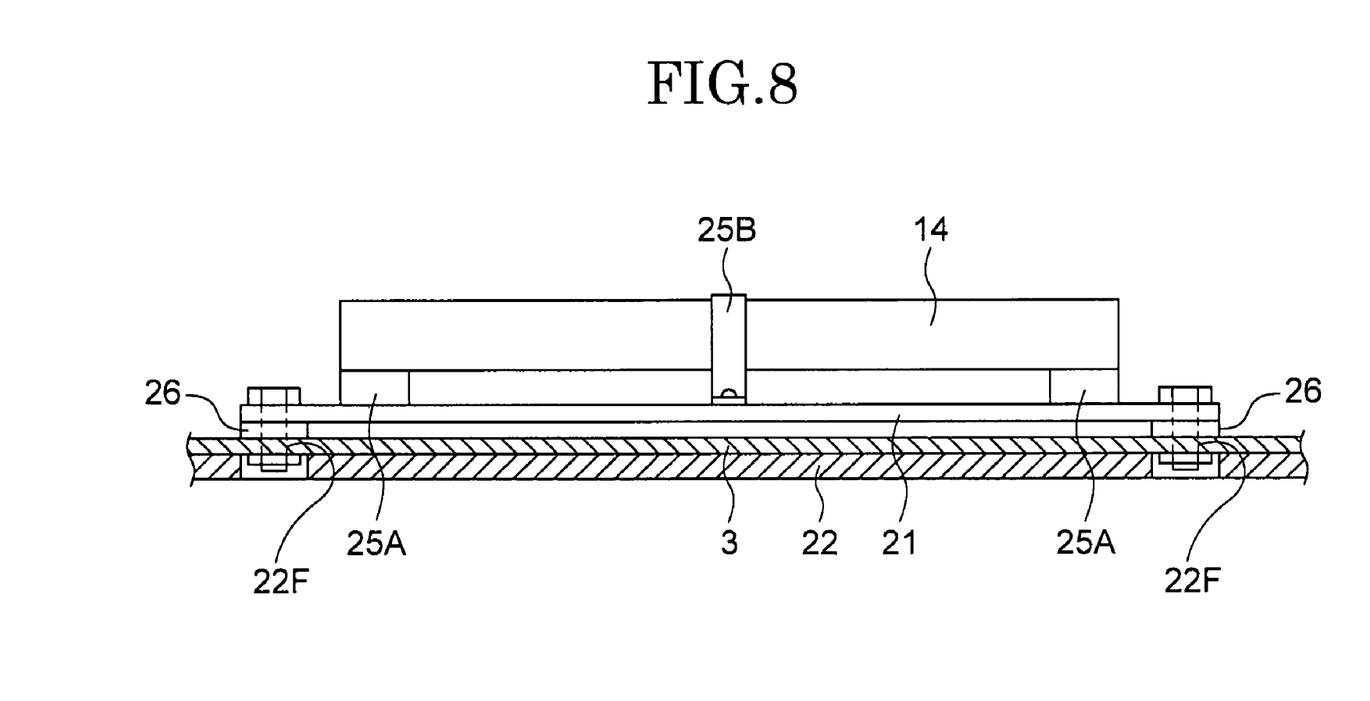
FIG. 8 is a partial sectional view of the optical part-holding member as viewed from a direction of arrow D for explaining a held state of a retuning mirror to the optical part.

The returning mirror 14 is supported on a pair of posture-holding members 25A, which are disposed to space in a longitudinal direction thereof and attached to the optical-part holding member 21. The returning mirror 14 is biased to the posture-holding members 25A by a plate-like spring 25B, which is attached to the optical-part holding member 21.

The optical-part holding member 21 is provided with a spacer or spacing member 26 at each of places corresponding to the mounting holes 22F in the embodiment, as shown in FIG. 8. The spacer also constitutes the spacing mechanism. For example, any resilient member such as rubber, non-ferrous metal or plastic material can be used for the spacer 26.

The optical-part holding member 21 is disposed to space from the bottom wall 3 of the housing 1 between the mounting holes 22F by means of the spacer 26. Because the optical-part holding member 21 is fixed to the housing 1 at the nodal points and the remaining part thereof is disposed to space from the bottom wall of the housing 1, even if vibrations from the image forming apparatus are transmitted to the housing 1 through the structure member 22, the vibrations can be prevented from transmitting to the optical-part holding member 21.

Additionally, ribs may be provided at places corresponding to the mounting holes 22F and downward of the optical-part holding member 21, in place of the spacers 26.

According to the light scanning apparatus, a light beam Q emitted from the light source unit 10 is scanned by the polygon mirror in a main scanning direction or a direction for scanning the light beam, reflected downwardly on the returning mirror 14 through the fθ lens 12 and the scanning lens 13, and guided to a photoconductor drum 27 constituting a portion of the image forming apparatus passing through the straight opening 4C to expose the photoconductor drum. Thereby, an electrostatic latent image is formed on the photoconductor drum 27.

According to the embodiment, because the mounting holes are disposed at the nodal points on the bottom wall 3 of the housing 1 and each optical-part holding member is spaced from the bottom wall 3, the places for mounting the parts do not almost vibrate, the vibrations from the structure member 22 can be prevented from transmitting to the optical-part holding members. Consequently, blurring of an optical axis for scanning by the vibrations can be avoided and a banding can be prevented from occurring in a recorded paper 28.

Moreover, because the housing is made of the plate metal, it is possible to avoid thermal deformation of the housing by heat generation of the polygon mirror scanner-unit itself or heat transmitted from a fixing unit (not shown).

Moreover, because each of the optical-part holding members 20 and 21 for holding the optical parts is provided in every each optical part, each optical-part holding member is attached detachably to the housing 1, it is possible to remove the optical-part holding members from the housing 1 without contacting the optical parts with hands.

In addition, gathering from the viewpoint of recycle, because the housing is made of the plate metal, it can be recycled by melting it. A mold having excellent mass productive can be produced in a short time, because the housing 1 can be formed only by means of a drawing process of the plate metal.

Furthermore, because a magnetic steel plate is used to the housing 1, an operator for assembling can use a magnet in assembling, hence the assembling can be efficiently carried out and burden of the operator can be reduced.

Although some embodiments have been described, the same material as the housing 1 or a material different from the housing may be used for the optical-part holding members 19 to 21. As an example, natural oscillation of the optical-part holding members 19 to 21 is preferably higher than that of the housing 1 from the viewpoint of avoiding sympathetic vibration.

Meanwhile, the natural oscillation can be measured by attaching an acceleration-pick up to, for example, the housing 1 and the optical-part holding members 19 to 21, vibrating them and analyzing the vibrations by of use an FFT analyzer or first Fourier-transferring analyzer.

The natural oscillation of the optical-part holding members 19 to 21 is preferably more than 600 Hz.

Figure 9:
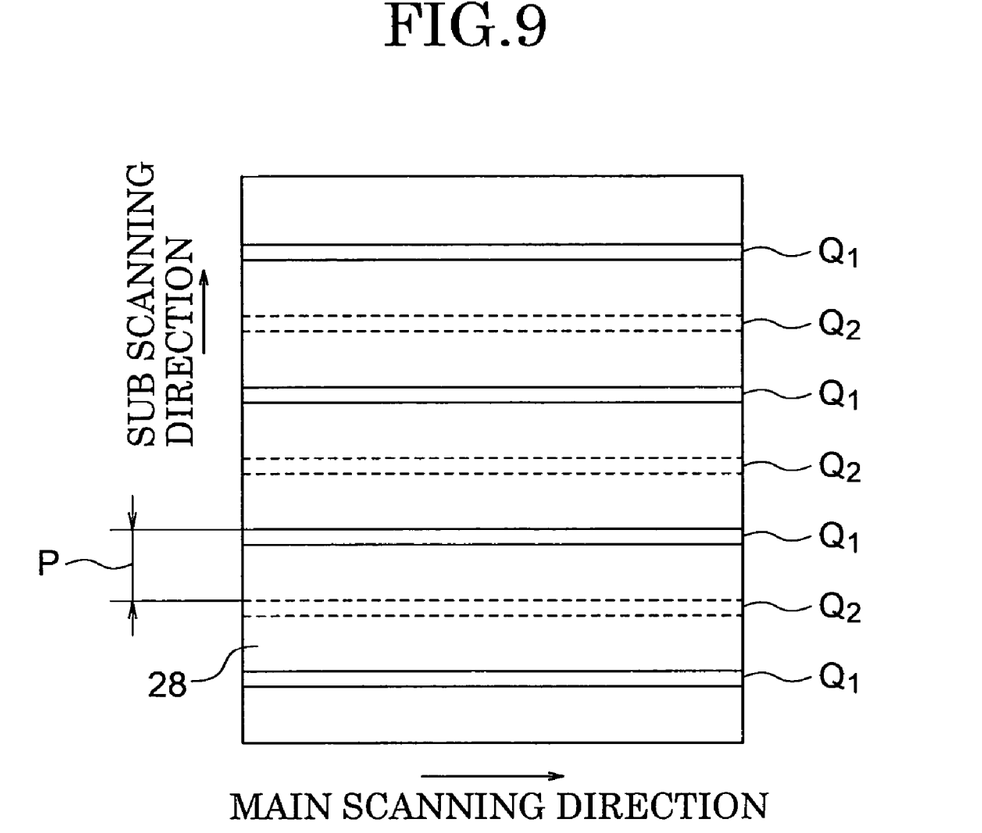
FIG. 9 is an explanatory view of a banding.

This is because the vibrations transmitted from the structural member 22 are less than approximately 600 Hz, and a pitch P from a strong place Q1 to a weak place Q2 in vibrations more than 600 Hz becomes very less and in a state indistinguishable whether a banding occurs on the recorded paper 28. Here, the banding means unevenness of an image, shading difference or color variation in which the strong place Q1 and the weak place Q2 are periodically generated in a sub scanning direction which is perpendicular to the main scanning direction and a direction for sending the recorded paper, when the image is transferred and recorded on the recorded paper 28, as conceptually shown in FIG. 9.

Figure 10:
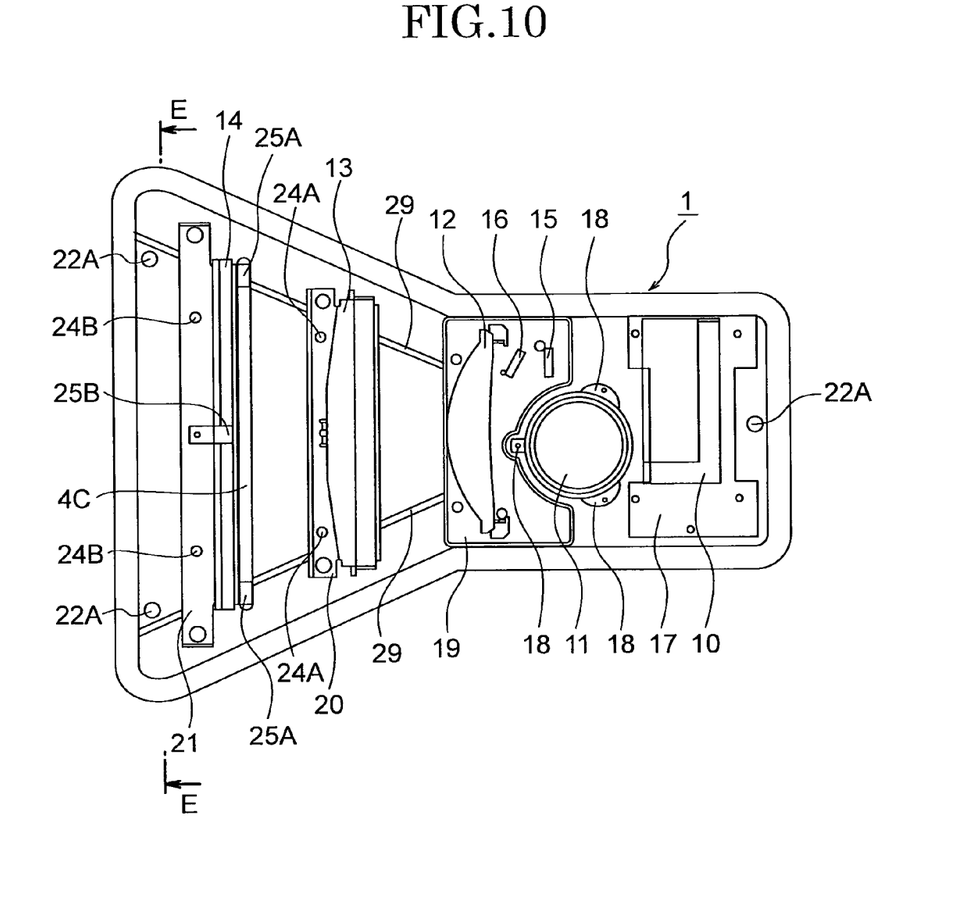
FIG. 10 is a top plan view showing another embodiment of the housing made of the plate metal in the optical scanning apparatus according to the present invention.
Figure 11:
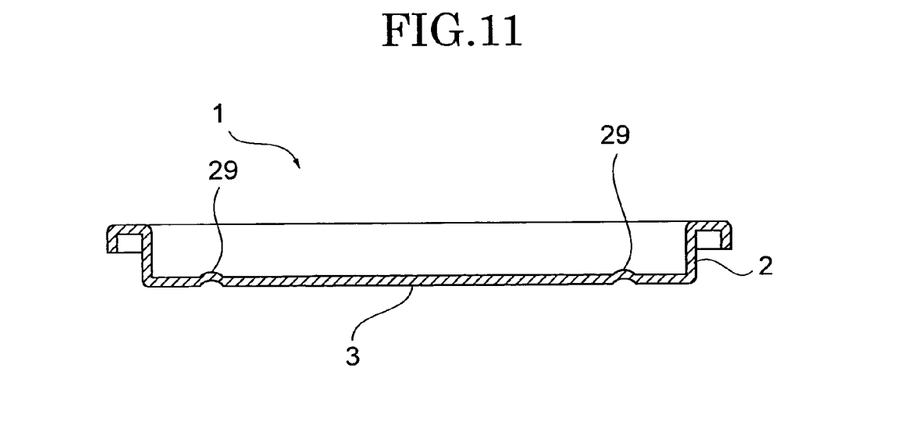
FIG. 11 is a sectional view taken along E-E line in FIG. 10.

Meanwhile, as shown in FIGS. 10 and 11, beads 29 may be provided on the bottom wall 3 of the housing 1 to extend along the peripheral wall 2, in place of the drawn portion 8, and the mounting holes 22E and 22F in which the optical-part holding members 20 and 21 are attached, may be provided in mounting places positioned on nodal points between each bead 29 and the peripheral wall 2.

According to the present invention, one or more parts can be attached on the fixing member or the housing at the nodal points to space from the bottom wall of the housing, therefore the vibrations on the housing are prevented from transmitting to the parts.

In the embodiments as described above, although the spacing mechanism structures the projected parts such as the drawn portion and so on configured to stand from the bottom wall of the fixing member or housing, the optical-part holding member, the spacer or spacing member and so on, which act to space the parts from the bottom wall of the housing except for the part-attaching portions for forming the nodal points, the spacing mechanism is not limited to the embodiments.

Meanwhile, in the above-mentioned embodiments, to reinforce the housing 1, a downwardly projecting and circularly raised wall 6 may be formed on a peripheral wall of the circular opening 4A in a back surface of the bottom wall 3. An annular bead may be formed on the peripheral wall of the circular opening 4A by welding, in place of the circularly raised wall 6. A downwardly projecting and straight wall 7 may be also formed along a periphery of the linear opening 4C, as shown in FIG. 3. If one or more openings are provided in appropriate places on the bottom wall 3 and projecting portions are provided on peripheral walls of the openings, a lighter housing is acquired and the strength of the housing is maintained.

Although the preferred embodiments of the present invention have been described, the present invention is not limited to the embodiments. In the embodiments, the method and apparatus for attaching a part according to the present invention are applied to the light scanning apparatus, but may be applied to the other any apparatuses. Various modifications and changes can be made for the above-mentioned embodiments.

What is claimed is:

1. A method for attaching a part, comprising:
preparing a fixing member having a bottom wall configured to attach at least one part;
identifying at least one part-attaching portion forming a nodal point which does not vibrate even if the fixing member is subjected to vibrations, on the bottom wall of the fixing member; and
mounting the part on the at least one part-attaching portion in a state that the part is spaced from the bottom wall of the fixing member.

2. A method for attaching a part, comprising:
preparing a housing having a bottom wall, and an optical part-holding member configured to hold at least one optical part and mounted on the bottom wall of the housing;
identifying at least one part-attaching portion forming a nodal point which does not vibrate even if the housing is subjected to vibrations, on the bottom wall of the housing member; and
mounting the optical part on the at least one part-attaching portion through the optical part-holding member so that the optical part is spaced from the bottom wall of the housing.

3. An apparatus for attaching a part, comprising:
a fixing member having a bottom wall;
at least one part-attaching portion provided on the bottom wall of the fixing member and forming a nodal point which does not vibrate even if the fixing member is subjected to vibrations, the part being mounted on the at least one part-attaching portion; and
a spacing mechanism for spacing the part from the bottom wall of the fixing member.

4. A light scanning apparatus, comprising:
a housing having a bottom wall;
at least one part-attaching portion provided on the bottom wall of the housing and forming a nodal point of the housing, which does not vibrate even if the housing is subjected to vibrations; and
an optical part-holding member disposed on the at least one part-attaching portion and holding at least one optical part,
the optical part being mounted on the at least one part-attaching portion to space from the bottom wall of the housing through the optical part-holding member.

5. The light scanning apparatus according to claim 3, wherein a plurality of part-attaching portions for forming nodal points are provided on the bottom wall of the fixing member and a part is mounted on each of the plurality of part-attaching portions through the spacing mechanism so that the part is spaced from the bottom wall of the fixing member.

6. The light scanning apparatus according to claim 3, wherein a plurality of part-attaching portions for forming nodal points are provided on the bottom wall of the fixing member and one part is bridged over the plurality of part-attaching portions through the spacing mechanism so that the part is spaced from the bottom wall of the fixing member.

7. The light scanning apparatus according to claim 4, wherein a plurality of part-attaching portions for forming nodal points are provided on the bottom wall of the housing and an optical part-holding member is disposed on each of the plurality of part-attaching portions.

8. The light scanning apparatus according to claim 4, wherein a plurality of part-attaching portions for forming nodal points are provided on the bottom wall of the housing and one optical-part holding member is bridged over the plurality of part-attaching portions.

9. The apparatus for attaching a part according to claim 3, wherein the fixing member is made by formation of one metal plate.

10. The apparatus for attaching a part according to claim 9, wherein the fixing member made by forming the metal plate has a bent peripheral wall.

11. The apparatus for attaching a part according to claim 3, wherein the spacing mechanism includes at least one projected part configured to raise from the bottom wall of the fixing member on the part-attaching portion for forming the nodal point.

12. The apparatus for attaching a part according to claim 11, wherein the projected part comprises a drawn portion formed by drawing the bottom wall of the fixing member.

13. The apparatus for attaching a part according to claim 3, wherein the spacing mechanism includes a spacer disposed on the part-attaching portion for forming the nodal point.

14. The light scanning apparatus according to claim 4, wherein the housing is made of one metal plate.

15. The light scanning apparatus according to claim 4, wherein the housing is formed into a box-like shape by one metal plate, the housing made of the metal plate having a bent peripheral wall extending throughout all periphery of the housing, and the part-attaching portion being disposed adjacent to the peripheral wall.

16. The light scanning apparatus according to claim 4, wherein inherent frequency of the optical part-holding member is greater than that of the housing.

17. The light scanning apparatus according to claim 4, wherein the bottom wall of the housing includes a projected part formed on the part-attaching portion for forming the nodal point, the optical part-holding member being mounted on the projected part so that the optical part optical held on the part-holding member is spaced from the bottom wall of the housing.

18. The light scanning apparatus according to claim 4, wherein the optical part-holding member includes at least one rib, the optical part-holding member being mounted on the part-attaching portion through the rib so that the optical part held on the optical part-holding member is disposed to be spaced from the bottom wall of the housing.

19. The light scanning apparatus according to claim 4, wherein the optical part includes a light-source unit, a unit for scanning a polygon mirror and optical parts for focusing.

20. The light scanning apparatus according to claim 14, wherein an opening to mount a unit for scanning a polygon mirror is provided in the bottom wall of the housing made of the metal plate, a projected part being formed to surround the opening.

21. The light scanning apparatus according to claim 20, wherein the projected part includes a circularly raised wall or annular bead.

22. The light scanning apparatus according to claim 14, wherein an opening for leading scanned light reflected on a returning mirror of the optical part to a photoconductor drum is formed in the bottom wall of the housing made of the metal plate, a projected part being formed on a periphery of the opening.

23. The light scanning apparatus according to claim 22, wherein the projected part includes a straightly raised wall portion formed on a peripheral wall of the opening.

24. The light scanning apparatus according to claim 16, wherein the inherent frequency of the optical part-holding member is more than 600 Hz.

25. The light scanning apparatus according to claim 4, wherein the optical part-holding member is provided every the optical part.

26. The light scanning apparatus according to claim 4, wherein a positioning member for positioning the optical part on the housing is provided on the optical part-holding member, the positioning member and the optical part being exchangeable integrally.

27. The light scanning apparatus according to claim 4, wherein the housing is made of a magnetic steel plate.

28. An image forming apparatus comprising the apparatus for attaching a part as recited in claim 3.

29. An image forming apparatus comprising the light scanning apparatus as recited in claim 4.

* * * * *